United States Patent Office 3,533,781
Patented Oct. 13, 1970

3,533,781
PROCESS FOR PRODUCING DISPERSION HARDENED NICKEL
Victor Allen Tracey, Solihull, and Thomas Brian Ashcroft, Birmingham, England, assignors to The International Nickel Company, Inc., New York, N.Y., a corporation of Delaware
No Drawing. Filed Mar. 12, 1968, Ser. No. 712,352
Claims priority, application Great Britain, Mar. 14, 1967, 11,963/67
Int. Cl. F16h 13/02
U.S. Cl. 75—206                    3 Claims

ABSTRACT OF THE DISCLOSURE

A small amount of magnesium included in dispersion-hardened nickel improves the strength at room temperature and at elevated temperatures as compared to similarly produced material devoid of magnesium.

---

It is well known that the high-temperature strength and the high-temperature structural stability of nickel can be increased by incorporating in the nickel as a finely dispersed phase, fine particles of a refractory material that is stable and inert at elevated temperatures, so that it does not react with the nickel. The dispersed phase is commonly a refractory oxide, but other refractory materials including carbides and nitrides have also been used. It has been shown that increase in the proportion of the dispersed phase increases the strength and the life to rupture under stress at high temperature, but when the dispersed phase amounts to more than 5% by volume the further increase in strength is offset by such work-hardening of the nickel as in effect to render it unworkable.

An object of this invention is to improve the properties of dispersion-hardened nickel.

Other objects and advantages will become apparent from the following description.

Generally speaking, the present invention contemplates incorporating magnesium in an amount up to 2% by weight in nickel containing an effective amount up to 5% by volume, e.g. from 0.5% or 1% to 5% by volume, of finely-dispersed refractory particles as a dispersion-hardening phase. We have surprisingly found that this addition of magnesium increases the strength and life to rupture without the work-hardening brought about by increase in the content of the dispersed phase. A very small amount of magnesium, for example 0.05%, produces improvement, but at least 0.5% magnesium is desirable, particularly for substantial improvement in the high-temperature properties. Above 2% magnesium, however, the ductility becomes so low that the nickel is barely workable.

The strengthened nickel may be produced by conventional powder-metallurgical methods, that is to say, by the steps of forming a powder charge, compressing the charge to a compact, sintering the compact, and consolidating the sintered compact. Before the compact is sintered it is preferably heated below the sintering temperature, e.g. in the range 350–450° C., in an atmosphere of hydrogen to remove oxygen and volatile impurities and to ensure that the compact is thoroughly permeated by the hydrogen. The temperature is then raised to the sintering temperature, suitably to the range 875–1125° C., and the compact is sintered.

The dispersed phase preferably consists of alumina. Examples of other suitable oxide dispersed phases are thoria and magnesia. Both the proportion and particle size of the dispersed phase affect the strength and ductility of the product, and the best combination of strength, ductility and workability is obtained when the dispersed phase amounts to from 1% to 4% by volume of the product. Broadly speaking the the particle size of refractory used to form the dispersed phase may range from 0.005 micron to 0.25 micron. If the refractory particles are too coarse, i.e. larger than about 0.25 micron, they do not bring about a useful increase in the high-temperature strength. Within the range from 0.005 to 0.25 micron the particles are preferably as fine as possible in order to obtain the highest strength. With decreasing size, however, difficulties are encountered in mixing the refractory material with the other constituents of the powder charge, since very fine powders tend to agglomerate during the mixing operation.

Some agglomeration of the refractory particles takes place during the sintering of the compacts. We find that the average size of the refractory particles in a sintered and consolidated compact containing magnesium in accordance with the invention is generally smaller than in a product made in the same way from identical starting materials without magnesium. Although the mechanism by which the incorporation of magnesium increases the strength of dispersion-hardened nickel is not fully understood, we believe that its action in inhibiting agglomeration and growth of the refractory particles during sintering is a contributory factor.

The magnesium may be incorporated in the powder mixture as such or preferably as the intermetallic compound $Ni_2Mg$ having the composition Ni—85%, Mg—15% by weight. If powdered metallic magnesium is used, care must be taken in producing the sintered compact to avoid such generation of heat by reaction between the magnesium and the nickel that local melting occurs which tends to destroy the fine dispersion of the refractory and impair the properties of the product. To this end the compact of magnesium powder, nickel powder and refractory is preferably heated in a hydrogen atmosphere well below the sintering temperature for long enough for substantially complete reaction between the nickel and magnesium and removal of impurities, e.g. for about 16 hours at about 400° C., before heating to the sintering temperature.

Whatever form of magnesium is used, small amounts of magnesium oxide may be introduced into the compact as a result of surface oxidation of the powder or by reaction between the magnesium and traces of oxygen contained in the nickel. When the magnesium is introduced as the intermetallic compound $Ni_2Mg$ in amounts of magnesium as great as 1% or 2%, a few particles of the compound have been observed in the sintered compacts, but apart from these traces of oxide and $Ni_2Mg$ we believe that in the sintered compacts substantially all the magnesium is alloyed with the nickel.

As an example of the production of sintered compacts, a charge of filamentary nickel powder of bulk density from 0.8 to 1 g./cc., powdered $Ni_2Mg$ ground to particle size of less than 44 microns and powdered gamma alumina of average particle size of 0.01 micron and having a particle size range from 0.005 micron to 0.015 micron may be milled in a nickel mill containing nickel balls in which the ratio of the weight of the balls to the weight of the powder charge is about 4:1. The milled charge may then be pressed into compacts (billets) under a pressure of 35 t.s.i. and the billets may be heated in hydrogen for 2 hours at 400° C. to remove impurities, followed by sintering for 2 hours at 1000° C., also in hydrogen.

Charges containing 2.5% gamma alumina by volume and varying amounts of $Ni_2Mg$, the remainder being nickel powder, were formed into billets in this way. The billets were canned in mild steel, heated to 1050° C. and consolidated by extrusion with an extrusion ratio of 41:1.

The tensile and elastic properties at room temperature and the stress-rupture properties at 815° C., of specimens of the extruded billets were ascertained as follows:

TABLE I.—RESULTS OF TENSILE TESTS AT ROOM TEMPERATURE

| Magnesium content (percent by weight) | 0.1% proof stress (t.s.i.) | U.T.S. (t.s.i.) | Elongation (percent on $\sqrt{A}$) | Modulus of elasticity (m.p.s.i.) | Reduction in area (percent) |
|---|---|---|---|---|---|
| 0 | 10.7 | 19.9 | 44.0 | 17.4 | 86.2 |
| 0.075 | 12.0 | 21.8 | 40.0 | 19.4 | 80.0 |
| 0.10 | 11.7 | 21.4 | 40.0 | 17.8 | 80.3 |
| 0.15 | 13.7 | 23.4 | 35.6 | 18.8 | 74.3 |
| 0.30 | 12.9 | 24.3 | 40.0 | 25.6 | 72.8 |
| 0.5 | 13.5 | 26.4 | 38.0 | 16.5 | 72.2 |
| 0.75 | 14.7 | 28.0 | 33.4 | 22.2 | 54.5 |
| 1.0 | 14.9 | 28.2 | 30.0 | 19.8 | 62.1 |
| 2.0 | 33.2 | 45.6 | 12.0 | 20.2 | 17.5 |
| 5.0 | 34.0 | 48.6 | 2.0 | 27.6 | 1.3 |

T.s.i.=Long tons per square inch.
M.p.s.i.=Millions of pounds per square inch.
U.T.S.=Ultimate tensile stress.

TABLE II.—STRESS-RUPTURE LIFE AT 815° C.

| Magnesium content (percent by weight) | Stress (t.s.i.) | Time to rupture (hours) |
|---|---|---|
| 0 | 3.75 | 89.8 |
| 0.075 | 4.5 | 35.3 |
| 0.15 | 5.25 | 33.9 |
| 0.30 | 4.75 | 1139 |
| 0.50 | 5.0 | 33.5 |
| 0.75 | 5.0 | 117 |
| 1.0 | 4.5 | 470.5 |
| 2.0 | 4.5 | 482.8 |

The results in Table I show that although there is a progressive increase in the proof stress, ultimate tensile stress and stress-rupture strength of the alloys with increasing magnesium contents, the ductility begins to fall quite sharply with more than 1% magnesium, and has become very low when the magnesium content reaches 5%.

The effect of the incorporation of magnesium on the particle size of the dispersed phase is shown by the results in Table III, which were obtained by examination of sections of the sintered and extruded billets under the electron microscope:

TABLE III

| Magnesium content (percent by weight): | Average particle size of dispersed phase (microns) |
|---|---|
| 0 | 0.207 |
| 0.1 | 0.129 |
| 0.5 | 0.107 |

Although the present invention has been described in conjunction with preferred embodiments, it is to be understood that modifications and variations may be resorted to without departing from the spirit and scope of the invention, as those skilled in the art will readily understand.

We claim:

1. In the production of dispersion-hardened nickel by a process comprising compacting, sintering and consolidating a powder mixture including a finely-divided alumina dispersoid, wherein the fine refractory particles tend to agglomerate when the nickel material is heated for sintering and consolidation, the improvement for reducing the agglomerating tendency of the alumina particles which comprises introducing at least 0.05% up to about 2% by weight of magnesium as a Ni-Mg. alloy into said powder mixture.

2. The process according to claim 1 wherein the alumina has a particle size not exceeding about 0.25 micron in an amount of about 0.5% to about 5% by volume.

3. The process according to claim 1 wherein magnesium is employed in an amount of at least about 0.5% by weight.

References Cited

UNITED STATES PATENTS

| 3,176,386 | 4/1965 | Grant | 75—214 X |
| 3,368,883 | 2/1968 | Barnett | 29—182.5 |
| 3,382,051 | 5/1968 | Barnett | 75—201 X |
| 3,388,010 | 6/1968 | Stuart | 75—206 X |
| 3,409,419 | 11/1968 | Yates | 29—182.5 |

BENJAMIN R. PADGETT, Primary Examiner

A. J. STEINER, Assistant Examiner

U.S. Cl. X.R.

29—182.5